(12) United States Patent
Yanai et al.

(10) Patent No.: US 7,604,082 B2
(45) Date of Patent: Oct. 20, 2009

(54) SWING ARM PART STRUCTURE

(75) Inventors: Hideo Yanai, Saitama (JP); Kozo Yamada, Saitama (JP); Yuji Maki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 368 days.

(21) Appl. No.: 11/226,431

(22) Filed: Sep. 15, 2005

(65) Prior Publication Data
US 2006/0066069 A1    Mar. 30, 2006

(30) Foreign Application Priority Data
Sep. 30, 2004    (JP) .............................. 2004-289273

(51) Int. Cl.
*B60K 17/00*    (2006.01)
(52) U.S. Cl. ..................................... 180/348
(58) Field of Classification Search ................ 180/348, 180/352, 311, 312; 280/124.128, 124.135
See application file for complete search history.

(56) References Cited
U.S. PATENT DOCUMENTS
4,646,865 A    3/1987    Imaizumi et al.

2003/0132067 A1    7/2003    Ohura
2005/0253353 A1*   11/2005    Yamamura et al. .... 280/124.135
2006/0231308 A1*   10/2006    Takahashi et al. .......... 180/89.1

FOREIGN PATENT DOCUMENTS
JP       60-234028 A       11/1985
JP       2003-191881 A      7/2003

OTHER PUBLICATIONS
Patent Abstracts of Japan, Takayo et al., 2003-191881, Jul. 9, 2003.

* cited by examiner

*Primary Examiner*—Faye M. Fleming
(74) *Attorney, Agent, or Firm*—Birch, Stewart, Kolasch & Birch, LLP

(57) ABSTRACT

To provide a swing arm structure capable of suppressing the required rigidity of a cross member to a low level to reduce the weight of the cross member. In a swing arm structure, a swing arm includes a pair of left and right arm bodies with a cross member spanning therebetween. Ends of the swing arm suspend rear wheels. A rear wheel-driving rear drive shaft, connected to a rear final reduction gear unit, is placed above the cross member. As viewed laterally, the cross member is contained within the profile of each arm body and is formed to be trapezoidal in section such that its bottom portion is broader than its upper portion.

24 Claims, 7 Drawing Sheets

SWING ARM PART STRUCTURE

CROSS-REFERENCE TO RELATED APPLICATIONS

The present non-provisional application claims priority under 35 USC 119 to Japanese Patent Application No. 2004-289273 filed on Sep. 30, 2004 the entire contents thereof is hereby incorporated by reference.

BACKGROUND OF THE INVENTION

1. Field of the Invention

The present invention relates to a swing arm part structure of a vehicle adopting a swing arm suspension.

2. Description of Background Art

A vehicle is known that is configured to include a swing arm having a pair of left and right arm bodies and a cross member span therebetween. The swing arm includes ends for suspending side wheels. A final reduction gear unit is provided. A wheel-driving rear drive shaft extends from the proximal end of the swing arm to the distal end thereof and is disposed above the cross member. See, Japanese Patent Laid-open No. 2003-191881. This arrangement is intended to allow the cross member to prevent the drive shaft from receiving scattering stones or the like.

However, in the related art, the cross member is provided to be bent downward and to project from the arm bodies. Therefore, the cross member needs a high rigidity against an external force from the road surface or the like, making it difficult to reduce weight.

SUMMARY AND OBJECTS OF THE INVENTION

It is therefore an object of the present invention to provide a swing arm structure capable of suppressing the required rigidity of a cross member to a lower level to reduce weight.

A swing arm structure has a swing arm 71 including a pair of left and right arm bodies 73 and a cross member 74 span therebetween. The swing arm includes ends for suspending rear wheels 3 and a rear wheel-driving rear drive shaft 12 connected to a rear final reduction gear unit 14 is placed above the cross member. As viewed laterally, the cross member is contained within a profile of each arm body, and is formed to be trapezoidal in section such that a bottom portion thereof is broader than an upper portion thereof.

With this configuration, since it does not project downwardly from each arm body, the cross member is not liable to come into contact with the road surface or the like. It is therefore unnecessary to increase the rigidity of the cross member more than is needed while otherwise taking such contact into consideration. Since the cross member is formed linearly, its rigidity can be easily secured. Since the bottom portion of the cross member is formed to have a wide width, the rear drive shaft is not liable to receive scattering stones or the like. On the other hand, the upper portion thereof is formed to have a narrow width. Thus, it is possible to reduce the weight of the cross member.

An embodiment of the present invention includes each of the arm bodies being bent to project downwardly.

With this configuration, the cross member spans between the arm bodies is brought into a lower location, which makes it easy to dispose the drive shaft at a position above the cross member.

An embodiment of the present invention provides the drive shaft that is dispose to be offset from the lateral middle of a vehicle body with a shock absorber 72 being disposed at the lateral almost-middle of the vehicle body.

With this configuration, while the shock absorber is placed at the lateral almost-middle of the vehicle body, the drive shaft and the drum brake unit are disposed on the left side and right side, respectively, of the shock absorber. This makes it easy to maintain good shock absorber performance.

An embodiment of the present invention provides the drive shaft to be disposed with an outer surface thereof exposed.

An embodiment of the invention provides the cross member for shielding the exposed portion of the drive shaft.

With this configuration, while a cover for the drive shaft can be eliminated to reduce cost and weight, the exposed portion of the drive shaft can be protected by the cross member.

According to an embodiment of the present invention, while the required rigidity of the cross member can be suppressed to a lower level to reduce weight. Thus, the rigidity can be easily secured, weight reduction can be achieved and the protectability of the drive shaft can be enhanced.

According to an embodiment of the present invention, the layout performance of the drive shaft can be enhanced.

According to an embodiment of the present invention, good shock absorber performance can be provided.

According to an embodiment of the present invention, in addition to the fact that the swing arm part is reduced in cost and weight, the protectability of the drive shaft can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
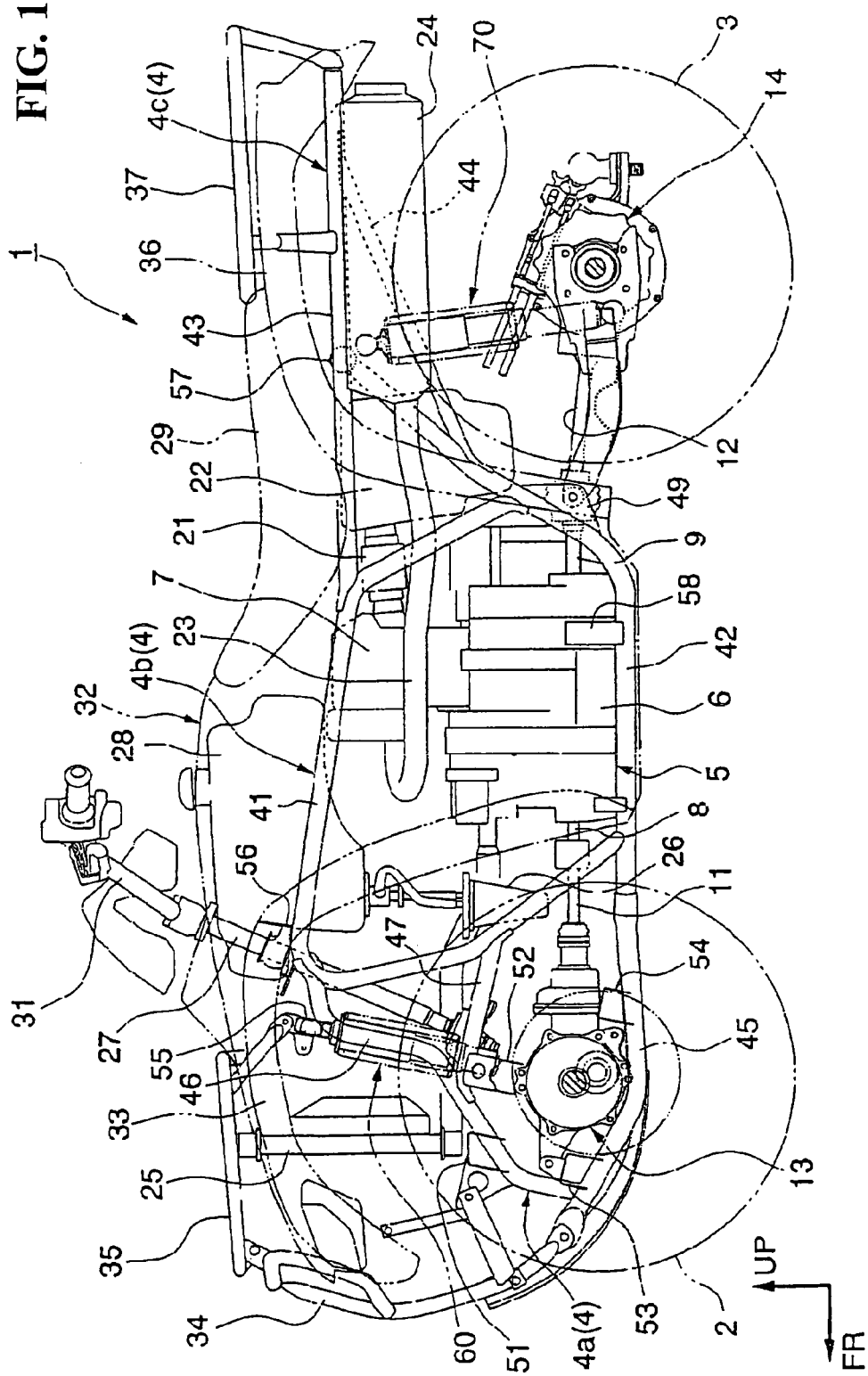
FIG. 1 is a side view of a four-wheeled buggy according to the present invention.

A preferred embodiment of the present invention will be described below with reference to the drawings. It is to be noted that the longitudinal and lateral directions in the following description are the same as those of the vehicle unless otherwise designated. In the drawings, arrow FR denotes the front of the vehicle, arrow LH the left-hand thereof and arrow UP the upside thereof.

A four-wheeled buggy (vehicle) illustrated in FIG. 1 includes a body constructed in a compact size and at a reduced weight with left and right front wheels 2 and rear wheels 3 located respectively at the front and rear portions of the body. The front and rear wheels 2, 3 are low-pressure balloon tires having a relatively large diameter. With this construction, the buggy is a so-called ATV (All Terrain Vehicle), which provides a satisfactory low height and enhances road ability on, particularly, a wasteland. The front and rear wheels 2, 3 are suspended by a front portion 4a and a rear portion 4c of the body frame 4 by means of front suspensions 60 and rear suspensions 70, respectively.

An engine 5 as a prime mover for the buggy 1 is mounted on the center portion (i.e., the substantially middle portion of the body) 4b of the body frame 4. The engine 5 is a water-cooled single cylinder reciprocal engine, by way of example, which has a so-called longitudinal layout in which the rotary axis of a crankshaft is arranged to extend along the back-and-forth direction of the vehicle. The engine 5 has a crankcase 6 and a cylinder unit 7 provided on the crankcase 6. A front output shaft 8 and a rear output shaft 9 extend along the back-and-forth direction toward the front and the back from the front portion and rear portion of the crankcase 6, respectively. More specifically, from respective locations offset to the left side relative to the middle of the widthwise direction of the vehicle.

The front and rear output shafts 8, 9 are connected to the front wheels 2 and the rear wheels through a front drive shaft 11 and a rear drive shaft 12, and a front final reduction gear unit 13 and a rear final reduction gear unit 14, respectively. In this way, the power of the engine 5 is transmitted through a transmission not shown housed in the crankcase 6, the output shafts 8 and 9, the drive shafts 11 and 12, and the final reduction gear units 13 and 14, to the front and rear wheels 2 and 3, respectively.

Figure 2:
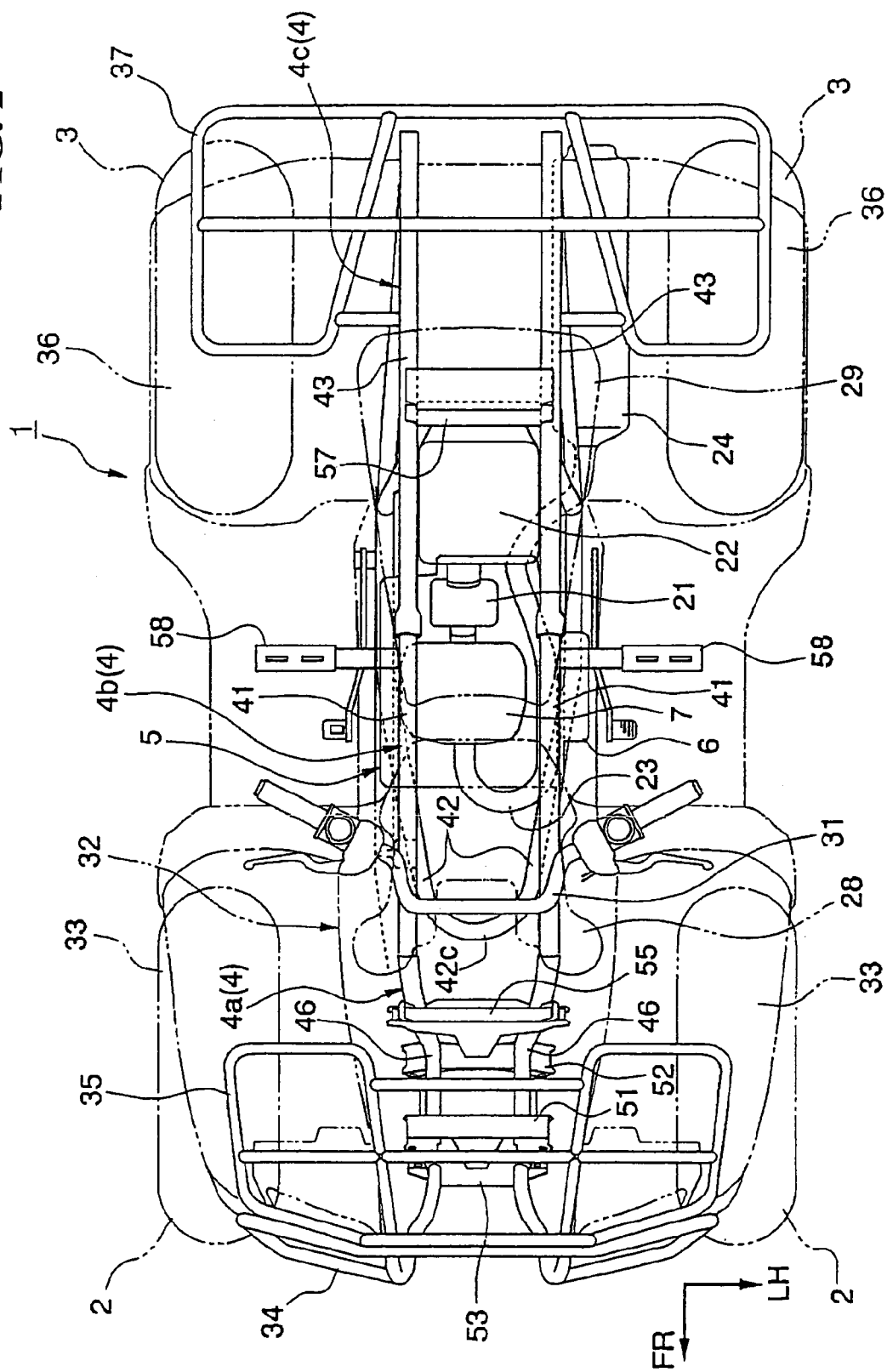
FIG. 2 is a top view of the four-wheeled buggy.

Referring to FIG. 2 as well as FIG. 1, a throttle body 21 is connected to the rear portion of the cylinder unit 7 included in the engine 5. An air cleaner case 22 is connected to the rear portion of the throttle body 21. The proximal end of an exhaust pipe 23 is connected to the front portion of the cylinder unit 7. The exhaust pipe 23 extends forward of the front portion of the cylinder unit 7, returning therefrom, and further extends backward while passing the left-hand of the cylinder unit 7. Then, it is at its distal portion connected to a muffler 24, which is located at the rear portion of the body. Incidentally, reference numeral 25 denotes a radiator for cooling the engine 5 and 26 a fuel pump for supplying under pressure fuel to an injector not shown.

A steering shaft 27, a fuel tank 28, a buggy seat 29 in that order from the front are arranged in the widthwise middle portion of the body of the buggy 1. A lower end of the steering shaft 27 is connected to a front wheel steering mechanism not shown and a top end of the steering shaft 27 is connected to a handlebar 31.

A resin-made body cover 32 is provided for covering the front body. A resin-made front fender 33 is provided for covering the front wheels 2 from above and toward the rear. A steel front protector 34, a steel front carrier 35, and the like are mounted to the front portion of the body frame 4. A resin-made rear fender 36 is provided for covering the rear wheels 3 from above and toward the front. A rear carrier 37 that is made of mainly steel and the like is mounted to the rear portion of the body frame 4.

Figure 3:
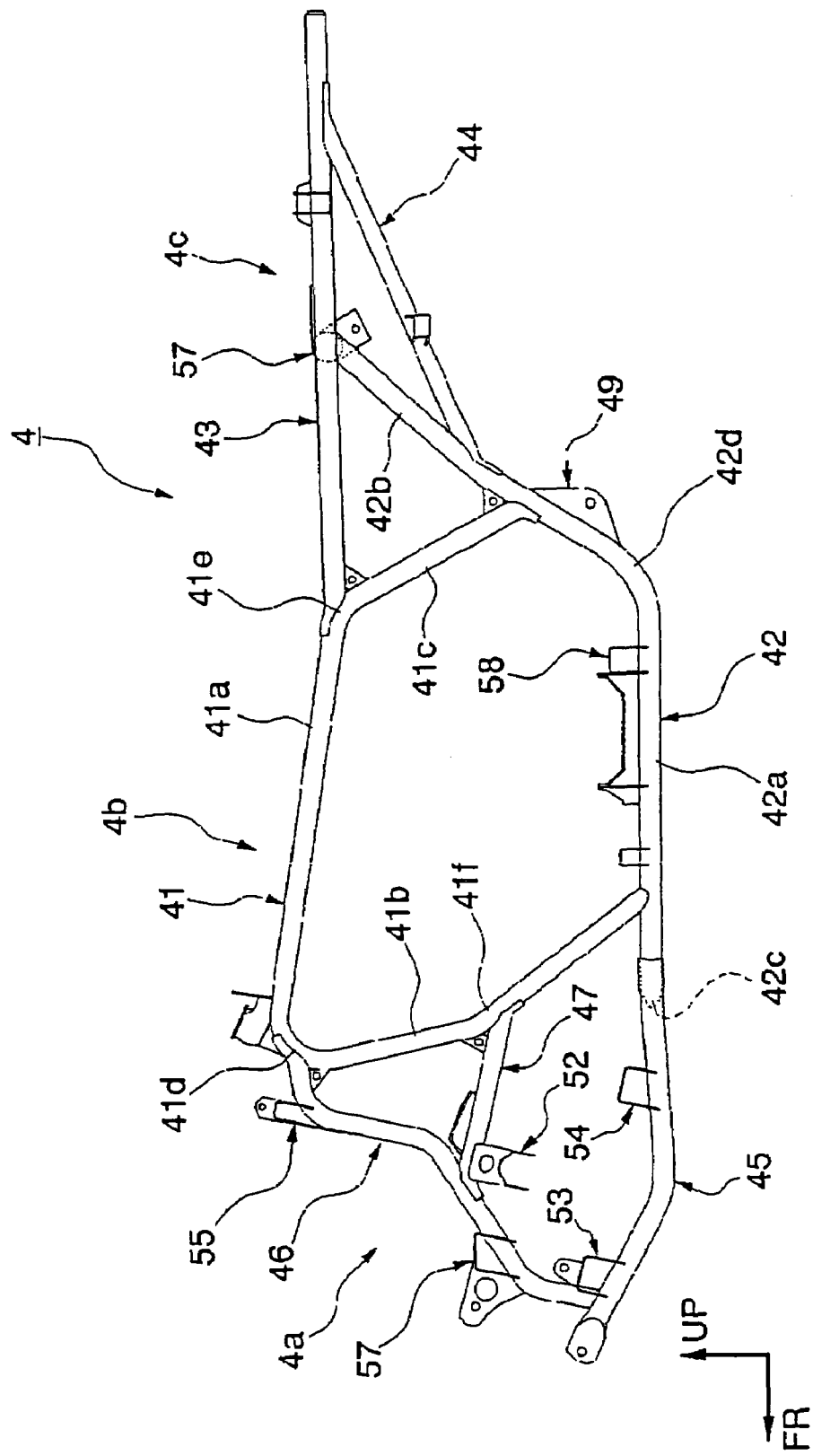
FIG. 3 is a side view of the body frame of the four-wheeled buggy.

Referring to FIG. 3 as well as FIGS. 1 and 2, the body frame 4 is composed of multiple kinds of steel products that are joined together by welding or the like. More specifically, an appropriate closed loop structure is made by using left and right upper pipes 41, lower pipes 42 and the like, which are then coupled to each other through a plurality of cross members. Thus, a box structure extending in the back-and-forth direction is formed in the widthwise middle portion of the vehicle. Here, a portion comprising mainly the upper pipes 41 and lower pipes 42 are referred to as the center portion 4b of the body frame 4.

Each upper pipe 41 includes an upper slant part 41a, a front slant part 41b, a rear slant part 41c, which constitute a single steel pipe subjected to bending. The upper slant part 41a is disposed on the upper external side of the body frame 4 to slightly slant rearwardly and downwardly. The rear slant part 41b extends from the front end of the upper slant part 41a toward an obliquely rearward downside so as to form an acute angle relative to the upper slant part 41a. The rear slant part 41c extends from the rear end of the upper slant part 41a toward an obliquely rearward downside so as to form an obtus angle relative to the upper slant part 41a. A description is set forth below with respect to, in the upper pipe 41, a bent portion between the upper slant part 41a and the front slant part 41 as a front bent portion 41d, and a bent portion between the upper slant part 41a and the rear slant part 41c as a rear bent portion 41e. In addition, a description will be made referring to a bent portion projecting forward at the almost middle portion of the front slant part 41b as an intermediate bent portion 41f.

Each lower pipe 42 includes a lower horizontal part 42a and a rear slant part 42b, which constitute a single steel pipe subjected to bending. The lower horizontal part 42a is disposed to extend almost horizontally on the lower exterior side of the body frame 4. The rear slant part 42b extends from the rear end of the lower horizontal part 42a toward the oblique rear upside so as to form an obtuse angle relative to the lower horizontal part 42b. The respective front ends (front ends of the lower horizontal parts 42a) of the left and right lower pipes 42 are connected to each other through an arc-shaped part 42c (refer to FIG. 2) so that the lower pipes 42 may form an integral construction. The arc-shaped pipe 42c projects forward as viewed from above the vehicle. A description is set forth below with regard to, as a lower bent portion 42d, a bent portion between the lower horizontal part 42a and the rear slant part 42b in each lower pipes 42.

The lower end of the front slant part 41b included in each upper pipe 41 is joined to the lower horizontal part 42a of the corresponding lower pipe 42 at a location near its front end. The lower end of the rear slant part 41c of each upper pipe 41 is joined to the rear slant part 42b of the corresponding lower pipe 42 at its longitudinally almost-middle position. A pivot bracket 49 is provided on the lower rear side of the rear slant part 41c of each upper pipe 41 and is integral therewith. The bracket 49 is formed to be flat and shaped approximately as a triangle extending in the front-and-rear direction. In addition, each bracket 49 is used to support the front end of a swing arm 71 for in the corresponding rear suspension 70.

The front end of each of the left and right rear upper pipes 43 is joined to the rear bent portion 41e of the corresponding upper pipe 41. The rear upper pipes 43 are arranged as seat rails to extend substantially horizontally. The upper end of the rear slant part 42b included in the lower pipe 42 is joined to the longitudinal almost-middle portion of the corresponding rear upper pipe 43. A rear sub-pipe 44 extends to slant rearwardly and upwardly from the longitudinal almost-middle portion of the rear slant part 42b included in the corresponding lower pipe 42 to the rear end of the associated rear pipe 43. A portion composed mainly of the rear pipes 43 and the rear sub-pipes 44 are referred to as the rear portion 4c of the body frame 4. A cross member spans between the longitudinal almost-middle portions of the left and right rear upper pipes 43 is referred to as a rear cross pipe 57.

Each of the rear ends of the left and right front lower pipes 45 are arranged to extend substantially horizontally and are joined to the lower horizontal part 42a of the corresponding lower pipe 42 at a location near the front end thereof. Each front lower pipe 45 bends toward the oblique upside and front, as viewed from the side of the vehicle, at a position near the axle of each front wheel 2. In addition, the front end of the front lower pipe 45 carries the lower end of the front protector 34. Operator's foot steps 58 are provided with respective step boards 58a, which extend between the front fender 33 and the rear fender 36.

Left and right front cushion pipes 46 extend from the front bent portions 41d of the upper pipes 41 to near the front ends of the front lower pipes 45, respectively. More specifically, each of the upper ends of the front cushion pipes 46 is joined to the corresponding front bent portion 41d. Each front cushion pipe 46 extends a little forwardly from the upper bent portion 41d of the corresponding upper pipe 41, and bends toward the oblique front and downside. In addition, it bends in a moderate crank shape such that its lower portion is located forwardly of its upper portion. The lower end of the front cushion pipe 46 is joined to the corresponding front lower pipe 45 at a position near the front end thereof. Left and right front sub-pipes 47 each span between the vertical almost-middle portion of each cushion pipe 46 and the intermediate bent portion 41f of the corresponding upper pipe 41 so as to slant slightly, forwardly and upwardly.

An intermediate front cross beam 51 and an upper center cross beam 55, both extending laterally, span between the left and right front cushion pipes 46. Likewise, a lower front cross beam 53 and a lower rear cross beam 54 each span between the left and right front lower pipes 45. In addition, an intermediate rear cross beam 52 spans between the left and right front sub-pipes 47. Here, a portion composed mainly of the front lower pipes 45, the front cushion pipes 46, the front sub-pipes 47 and the cross beams 51 to 55 is referred to as the front portion 4a of the body frame 4.

Figure 4:
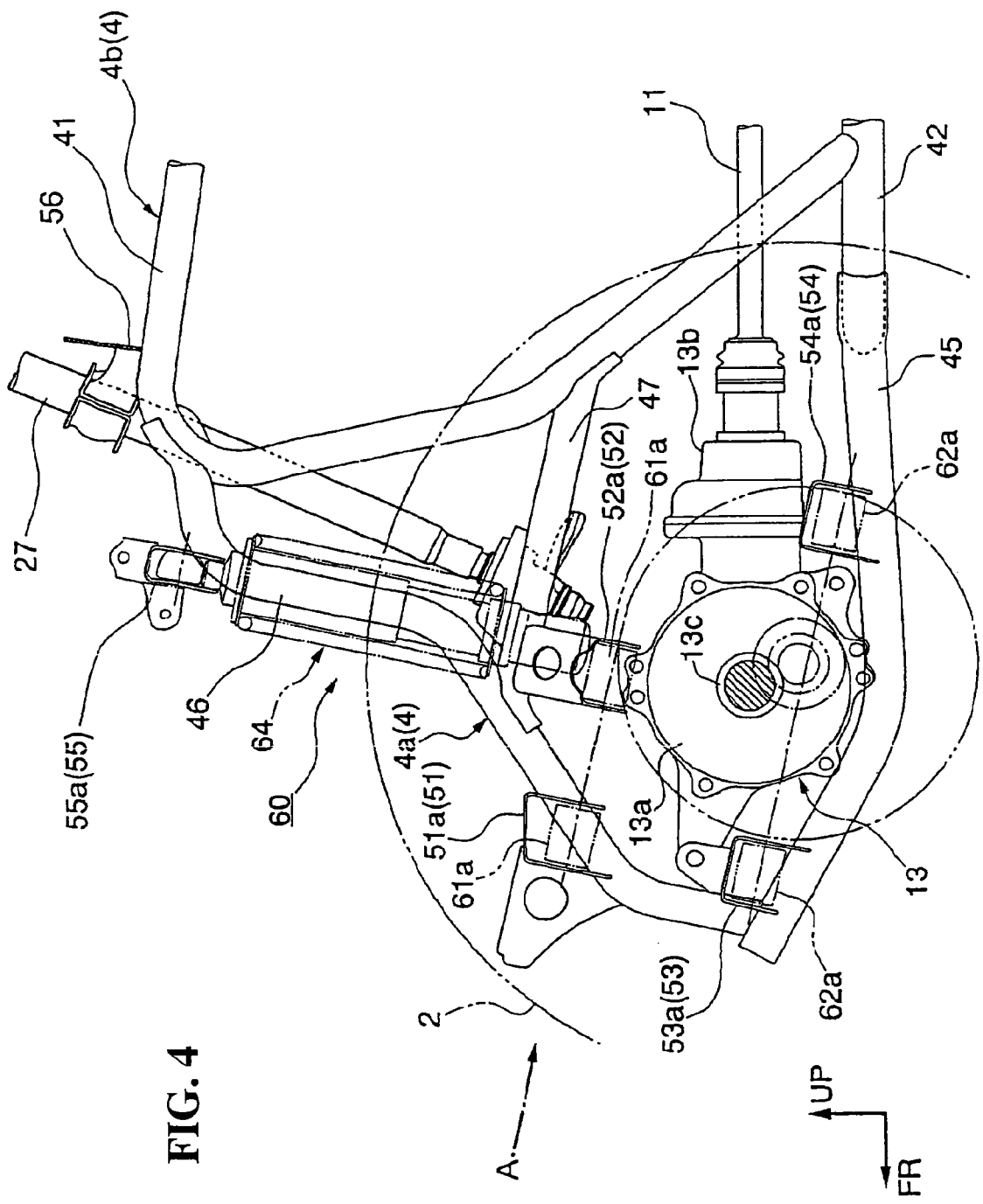
FIG. 4 is a side view of a front suspension of the four-wheeled buggy.
Figure 5:
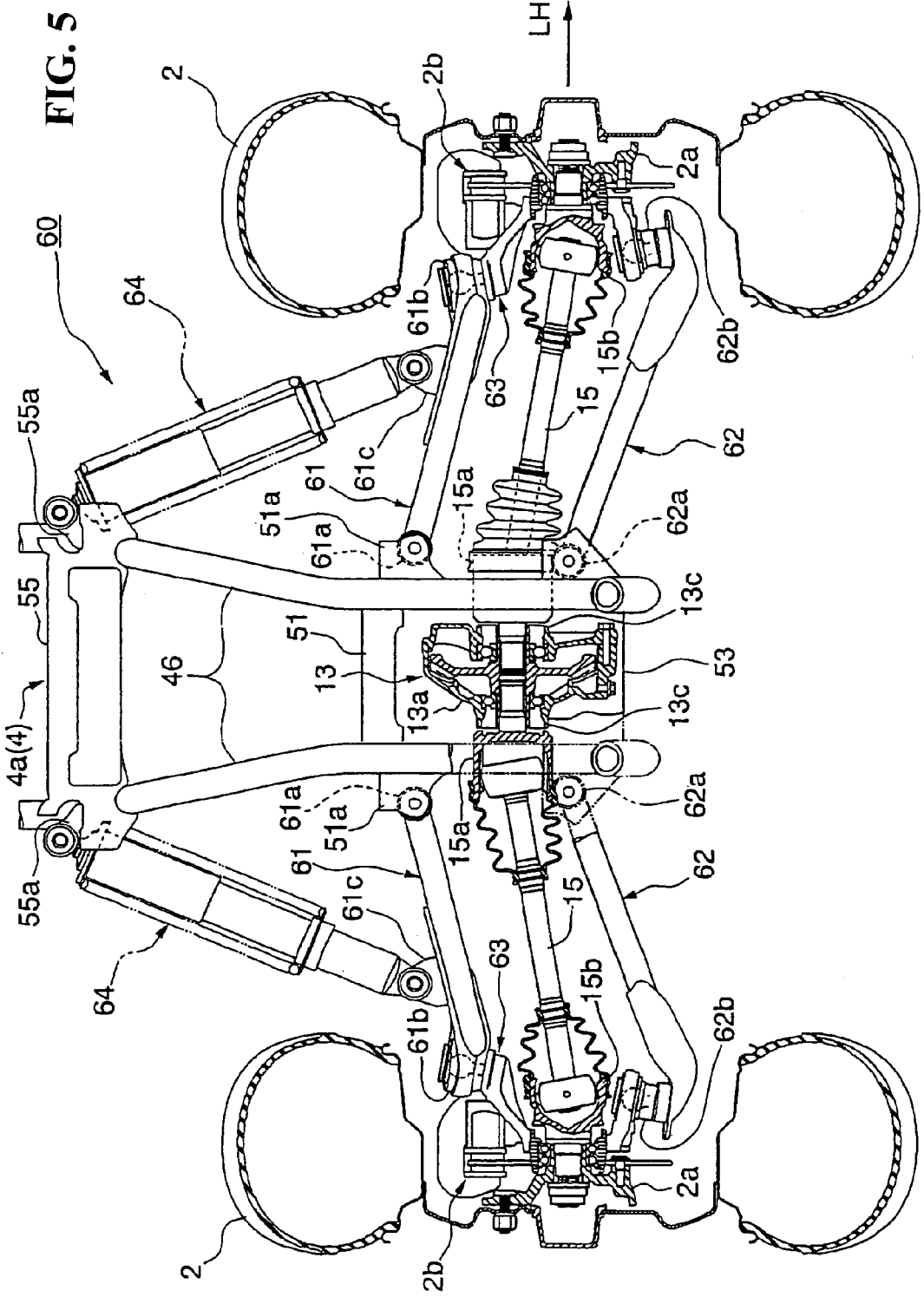
FIG. 5 is a top view of FIG. 4 as viewed from arrow A.

As shown in FIGS. 4 and 5, the front suspension 60 is carried by the front portion 4a of the body frame 4 that is formed as a double wishbone type suspension. More specifically, the suspension 60 is mainly composed of left and right upper arms 61 and lower arms 62 whose respective proximal ends are supported vertically swingably by the body frame 4, left and right knuckles 63 supported by the corresponding distal ends of the upper and lower arms 61, 62 and left and right front shock absorbers 64 each interposed between the corresponding lower arm 62 and the body frame 4.

The upper arms 61 and the lower arms 62 are each formed in an almost V-shape, that is, bifurcated from the side of the knuckle 63 (the distal side) toward the side of the body frame 4 (the proximal side) as viewed from above. Pipe-like frame connection parts 61a, 62a slanting rearwardly and downwardly are provided integrally with the corresponding bifurcated side ends of the upper and lower arms 61, 62. The frame connection parts 61a, 62a are provided parallel to each other and in such a manner so as to share a center axis for each of the upper arm 61 and lower arm 62.

Arm connection parts 51a, 52a corresponding to the front and rear frame connection parts 61a of each upper arm 61 are provided on both the sides of front and rear intermediate cross beams 51, 52. Likewise, arm connection parts 53a, 54a corresponding to the front and rear frame connection parts 62a of each lower arm 62 are provided on both the sides of front and rear lower cross beams 53, 54.

The respective frame connection parts 61a, 62a of the upper arm 61 and lower arm 62 are connected to the corresponding arm connection parts 51a to 54a by means of swing shafts (e.g., stepped bolts) passing through the corresponding ones along the respective center axes. In this state, the frame connection parts 61a, 62a are supported for turning by the corresponding arm connection parts 51a to 54a through the swing shafts and bearings disposed on the peripheries thereof. More specifically, the upper arms 61 and lower arms 62 are swingably carried by the front portion 4a of the body frame 4.

An upper portion and a lower portion of the knuckles 63 are connected to the distal portions of the upper arm 61 and lower arm 62 through ball joints 61b, 62b, respectively. The hub 2a of the front wheel 2 is rotatably supported by the corresponding knuckle 63. A disk brake unit 2b as a front wheel brake is disposed outside the knuckles and within the wheel of the front wheel 2.

Arm side mounts 61c that project upwardly are provided on the rear portions of the upper arms 61, respectively. The lower ends of the front shock absorbers 64 are connected to the corresponding arm side mounts 61c by means of connection shafts (e.g., stepped bolts) passing through the corresponding arm side mounts 61c, parallel to the respective center axes. In this state, the lower ends of the front shock absorber 64 are supported by the arm side mounts 61c or the upper arms 61 through bearings and connection shafts built in the lower ends, respectively.

Frame side mounts 55a are respectively provided on both sides of the upper center cross beam 55. The upper ends of the front shock absorber 64 are connected to the corresponding frame side mounts 55a by means of connection shafts (e.g., stepped bolts) passing through the corresponding ones, parallel to the respective center axes. In this state, the upper ends of the front shock absorbers 64 are respectively supported by the frame side mounts 55a, i.e., the body frame 4, through bearings and connection shafts built in the upper ends.

With this configuration, an impact load transmitted from the road surface to each front wheel 2 allows the corresponding upper arm 61 and lower arm 62 to swing individually and vertically. This expands and contracts the front shock absorber 64, whose buffering action absorbs the impact load moderately.

The casing 13a of the front final reduction gear unit 13 is integrally joined, with a bolt or the like, to the near-middle part of the front portion 4a included in the body frame 4. The front end of the front drive shaft 11 is coupled to the input part 13b of the front final reduction gear unit 13. This reduction gear unit 13 changes the rotational direction of the driving force of the front drive shaft 11 and also functions as a differential mechanism, which adjusts the distribution of the driving force to the left and right front wheels 2.

Left and right inner universal joints 15a are respectively disposed on the lateral outsides of the front final reduction gear unit 13. Connection rods extending from the inner universal joints 15a are coupled to the left and right output parts 13c, respectively, of the reduction gear unit 13. On the other hand, left and right outer universal joints 15b are disposed on the lateral insides of the knuckles 63, respectively. Connection rods extending from the outer universal joints 15b are coupled to the hub parts 2a of the front wheels 2, respectively.

Left and right drive shafts 15 span between the inner universal joints 15a and the outer universal joints 15b, respectively. More specifically, the inner ends of the drive shafts 15 are connected to the output parts 13c of the front final reduction gear unit 13 via the inner universal joints 15a, respectively. The outer ends of the drive shafts 15 are connected to the hub parts 2a of the front wheels 2, respectively.

The driving force output from the engine 5 to the front output shaft 8 is transmitted to the front wheels 2 via the front drive shaft 11, the front final reduction gear unit 13, the inner universal joints 15a, the drive shafts 15 and the outer universal joints 15b.

Figure 6:
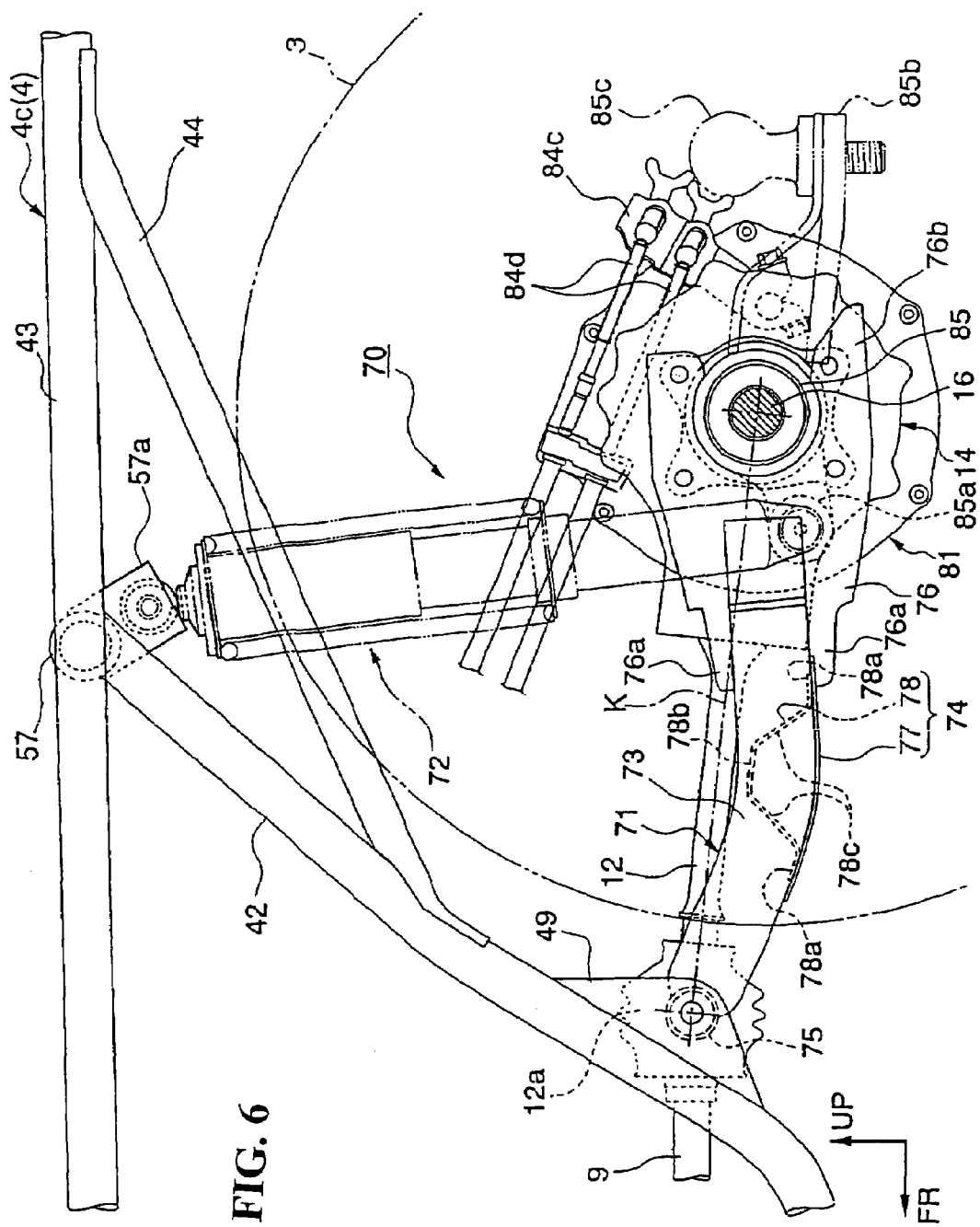
FIG. 6 is a side view of a swing arm rear suspension of the four-wheeled buggy.
Figure 7:
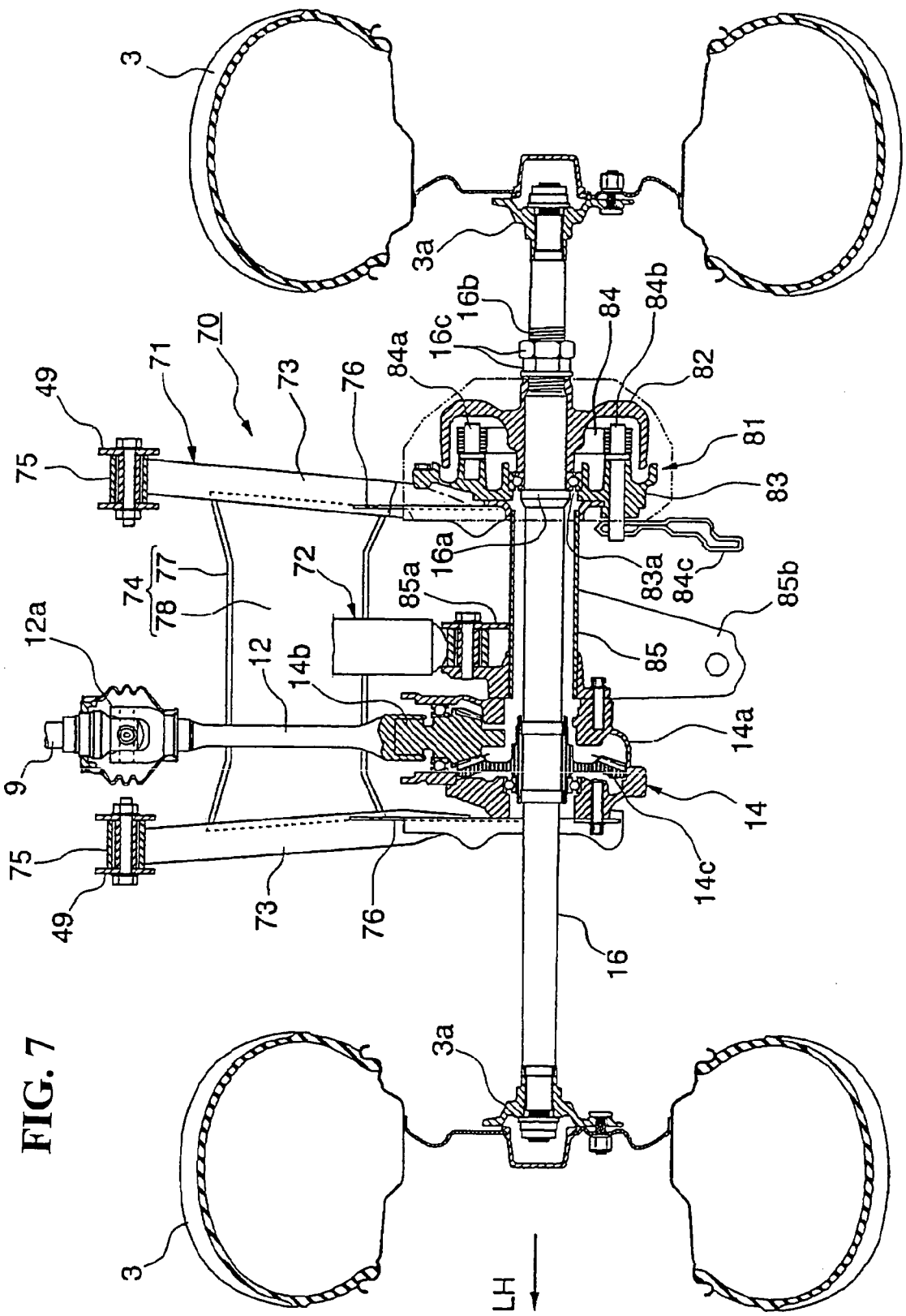
FIG. 7 is an explanatory side view of the swing arm rear suspension.

As shown in FIGS. 6 and 7, the rear suspension 70 suspending the rear wheels 3 is mainly composed of a swing arm 71 and a rear shock absorber 72. The swing arm 71 is vertically and swingably supported at its front ends by respective pivot brackets 49. In addition, the swing arm 71 rotatably supports at its rear ends a rear axle shaft 16 that spans between the respective hub parts 3a of the rear wheels 3. Such a swing arm 71 is disposed such that the major portion thereof, exclusive of the front end portion thereof, is located between the rear wheels 3.

The rear shock absorber 72 has a lower end which is joined to a portion near the rear end of the swing arm 71. In addition, the rear shock absorber 72 is disposed at the widthwise almost-middle portion of the vehicle body in such a manner as that it is slanted forward, that is, the upper end thereof is located forward of the lower end thereof. The upper end of the rear shock absorber 72 is coupled to the rear cross pipe 57 of the body frame 4. With this configuration, when receiving an impact load transmitted from the road surface, each rear wheel 3 swings vertically through the swing arm 71 to thereby expand and contract the rear shock absorber 72. In this way, the rear shock absorber 72 moderately absorbs the load through its buffering action.

The swing arm 71 includes left and right arm bodies 73 extending forwardly and rearwardly with a cross member 74 that spans between the left and right arm bodies 73. Left and right pivot connection parts 75 are provided at the front ends of the arm bodies 73, respectively. Left and right support plates 76 are provided at the rear ends of the arm bodies 73, respectively. The components of the swing arm 71 are integrally joined to one another by welding or the like. Such a swing arm 71 is placed symmetrically about the vehicle center.

Each of the arm bodies 73 is formed to bend downward and project at its longitudinal almost-middle portion. In addition, its front end is formed to dwindle or taper as viewed laterally, and its rear end is formed to dwindle or taper relatively moderately as viewed from above. Such arm bodies 73 are disposed to incline as viewed from above the vehicle body so as to reduce the distance therebetween as it goes rearwardly.

Each pivot connection part 75 is of a short pipe extending in the lateral direction and has a rear portion which is joined to the front end of the corresponding arm body 73.

Each support plate 76 is of a thick plate extending along the side of the vehicle body. The support plate 76 is provided at its front portion with a pair of upper and lower projections 76a so as to put therebetween the rear end of the corresponding arm body 73. In addition, the rear end of the arm body 73 is fitted into the front portion of the support plate 76 to be joined thereto. Each support plate 76 is provided at its rear portion with an almost-U shaped support portion 76b open rearwardly so as to support the rear axle shaft 16.

The cross member 74 extends substantially linearly along the lateral direction and spans between the bent portions of the arm bodies 73. Both sides of the cross member 74 are each tapered to broaden toward the end as viewed from above so as to increase the joint length between each side and the corresponding arm body 73 and alleviate stress concentration.

Such a cross member 74 includes a plate member 77 and a hat-shaped member 78. The plate member 77 has an arc-shaped cross-section extending along the lower side of each arm body 73 as viewed from the side of the vehicle. The hat-shaped member 78 has an almost-hat-shaped section projecting upwardly as viewed from the side of the vehicle. The front and rear lower edges 78a of the hat-shaped member 78 overlap the corresponding portions of the plate member 77 from above and are integrally joined to them by welding.

Front and rear wall portions 78c each span between the upper edge 78b and lower edges 78a of the hat-shaped member 78. The front and rear wall portions 78c are each provided to incline, reducing the distance between the upper edge 78b and each lower edge 78a as they goes downward (to the side of the plate member 77). The longitudinal length of the plate member 77 is greater than that of the hat-shaped member 78. Consequently, the longitudinal length of the bottom (the plate member 77) of the cross member 74 is sufficiently greater than that of the upper portion (the upper edge 78b of the hat-shaped member 78) thereof. In addition, an inner space almost-trapezoidal in section is defined in the cross member 74.

As viewed from the side of the vehicle body, the cross member 74 is placed such that its bottom extends along the lower side of each arm body 73 and its upper portion is located at a position lower than the upper side portion of each arm body 73. In other words, the vertical width of the cross member 74 is set to be narrower than that of each arm body 73. Accordingly, the cross member 74 does not project upwardly and downwardly from the arm bodies 73 as viewed from the side of the vehicle body.

It is assumed that a line connecting the pivotal center of the swing arm 71 and the axial center of the rear axle shaft 16 is an arm reference line K. The cross member 74 is placed to deviate downwardly from the arm reference line K. The rear drive shaft 12 is located such that its center axis coincides with the arm reference line K as viewed from the side of the vehicle body. Thus, a vertical clearance can be sufficiently secured between the rear drive shaft 12 and the cross member 74.

Each pivot connection part 75 is connected to the corresponding pivot bracket 49 by means of a pivot shaft (e.g., a stepped bolt) passing them through them in the lateral direction. With this state, the pivot connection part 75 is carried for rotation by the pivot bracket 49 via a pivot shaft and a bearing disposed on the circumference thereof. In short, the front end of the swing arm 71 is swingably supported by the body frame 4.

The rear final reduction gear unit 14 is mounted to the left support plate 76. The reduction gear unit 14 is adapted to convert the driving force from the rear drive shaft 12 into the driving force of the rear axle shaft 16. On the other hand, a drum brake unit 81 as a rear wheel brake is mounted to the right support plate 76. The rear axle shaft 16 is rotatably carried by the rear end of the swing arm 71 through the reduction gear unit 14 and the drum brake unit 81.

The rear final reduction gear unit 14 is placed to be offset to the left side of the vehicle body for alignment with the rear axle shaft 9 of the engine 5. The rear output shaft 9 has a rear end which is coupled to the front end of the rear drive shaft 12 through the universal joint 12a. In this case, the universal joint 12a is placed such that its movable center is positioned on the pivot center. The rear drive shaft 12 has a rear end which is coupled to the input side bevel gear 14b of the reduction gear unit 14. The rear drive shaft 12 is put between the universal joint 12a and the reduction gear unit 14 in such a manner that its outer surface is exposed and this exposed area is entirely shielded from below with the cross member 74.

The bevel gear 14b in meshing engagement with a larger diameter bevel gear 14c is rotatably carried in the casing 14a of the reduction gear unit 14. The larger diameter bevel gear 14c is disposed coaxially with the rear axle shaft 16. The hub of the larger diameter bevel gear 14c is splined to the rear axle shaft 16 passing through the hub.

The casing 14a is integrally fastened to the support plate 76 with bolts or the like in such a way that the left surface of the casing 14a is in contact with the right surface of the support plate 76. Thus, the rear axle shaft 16 is carried for rotation by the rear end of the left arm body 73 through the reduction gear unit 14.

The driving force output from the engine 5 to the rear output shaft 9 is transmitted to each rear wheel 3 through the universal joint 12a, the rear drive shaft 12, the reduction gear unit 14 and the rear axle shaft 16.

The drum brake unit 81 includes a brake drum 82 open to the left and a brake base 83 disposed on the left side of and opposite to the brake drum 82.

The brake drum 82 is disposed coaxially with the rear axle shaft 16. The hub of the brake drum 82 is splined to the rear axle shaft 16 passing through the hub.

The brake base 83 is integrally fastened to the support plate 76 with bolts or the like in such a way that the left surface of the brake base 83 is in contact with the right surface of the support plate 76. The brake base 83 is carried by the rear axle shaft 16 passing through the hub of the brake base 83 for rotation via a ball bearing 83a.

A pair of brake shoes 84 is supported by the brake base 83 so as to enable wear contact with the inner circumference of the brake drum 82. More specifically, the brake base 83 is provided with anchor pins 84a extending perpendicularly therefrom and serving as spindles of the brake shoes 84. In addition, the brake base 83 turnably supports a cam shaft 84b, which expands the brake shoes 84 for a braking operation. An operation lever 84c is serration-fitted to the end of the cam shaft 84c. The operation lever 84c is operated through cables 84d by operating a brake-operating element not shown, so that the cam shaft 84b is turned to expand the brake shoes 84, which come into wear contact with the inner circumference of the brake drum 82.

The right surface of an annular projection 16a formed on the outer circumference of the rear axle shaft 16 is in contact with the left side of the inner race of the ball bearing 83a. In addition, the left surface of the hub of the brake drum 82 is in contact with the right surface of the inner race of the ball bearing 83a. A portion of the rear axle shaft 16 is circumferentially threaded in the vicinity of the right end of the drum brake unit 81 to form a screw thread portion 16b thereat. Two nuts 16c are fastened to the screw thread portion 16b to double-nut secure the drum brake unit 81. Consequently, the drum brake unit 81 and the rear axle shaft 16 are restricted in terms of the lateral positions with respect to the swing arm 71 (the right arm body 73).

A cylindrical axle housing 85 extending in the lateral direction is disposed between the drum brake unit 81 and the rear final reduction gear unit 14. The rear axle shaft 16 is inserted through the axle housing 85. The axle housing 85 is integrally joined to the reduction gear unit 14 with bolts or the like in such a way that the left surface of the left end flange included in the axle housing 85 is in contact with the right surface of the casing 14a for the reduction gear unit 14. The right surface of the right end flange included in the axle housing 85 is in contact with the left surface of the brake base 83 included in the drum brake unit 81. In other words, the axle housing 85 functions as a distance collar between the drum brake unit 81 and the reduction gear unit 14.

A lower mount 85a projecting obliquely downwardly and forwardly is provided at the lateral almost-middle portion of the axle housing 85. The lower end of the rear shock absorber 72 is coupled to the lower mount 85a by means of a connection shaft (e.g., stepped bolt) passing through them in the lateral direction. The upper end of the rear shock absorber 72 is coupled to an upper mount 57a provided at the lateral almost-middle portion of the rear cross pipe 57 included in the body frame 4 by means of a connection shaft (e.g., stepped bolt) extending in the lateral direction. In addition, a mount bracket 85b extending rearwardly is provided at the lateral almost-middle portion of the axle housing 85. The mount bracket 85b and a hitch ball 85c carried by the mount bracket 85b mainly constitute a "trailer hitch."

As described above, in the swing arm part structure, the swing arm 71 includes the pair of left and right arm bodies 73 with the cross member 74 spanning therebetween. Rear ends of the swing arm 71 suspend the rear wheels 3, and the rear wheel-driving rear drive shaft 12 connected to the rear final reduction gear unit 14 is placed above the cross member 74. As viewed laterally, the cross member 74 is contained within the profile of each arm body 73, and is formed to be trapezoidal in section such that its bottom portion is broader than its upper portion. In addition, each arm body 73 is bent into a downward projection.

With this configuration, since it does not project downwardly from each arm body 73, the cross member 74 is not liable to come into contact with the road surface or the like. It is therefore unnecessary to increase the rigidity of the cross member 74 more than is needed, otherwise taking such contact into consideration. Since the cross member 74 is formed linearly, its rigidity can be easily secured. Since the bottom portion of the cross member 74 is formed to have a broad width, the rear drive shaft 74 is not liable to receive scattering stones. On the other hand, the upper portion thereof is formed to have a narrow width. Thus, it is possible to reduce the weight of the cross member 74.

In short, the required rigidity of the cross member 74 can be suppressed to a low level while the rigidity can be secured with ease, thus reducing the weight. In addition, protectability of the rear drive shaft 12 can be enhanced.

In the swing arm part structure, the arm bodies 73 is bent to project downwardly with the cross member 74 spanning therebetween into a lower location, which makes it easy to dispose the rear drive shaft 12 at a position above the cross member 74. In other words, the layout performance of the rear drive shaft 12 can be enhanced.

In the swing arm part structure, the rear drive shaft 12 is disposed at a position offset to the left-hand side from the lateral center of the vehicle body. On the other hand, the rear shock absorber 72 interposed between the body frame 4 and the swing arm 71 is placed at the lateral almost-middle portion of the vehicle body. In this way, while the rear shock absorber 72 is placed at the lateral almost-middle portion of the vehicle body, the rear drive shaft 12 and the drum brake unit 81 are disposed on the left side and right side, respectively, of the shock absorber 72. This optimizes the layout of the swing arm rear suspension 70, providing good cushion performance.

Additionally, in the swing arm part structure, while the rear drive shaft 12 is disposed with its outer surface exposed, the cross member 74 shields the exposed portion of the rear drive shaft 12. Accordingly, while a cover for the rear drive shaft 12 can be eliminated to reduce cost and weight, the exposed portion of the rear drive shaft 12 can be protected by the cross member 74. In other words, in addition to the fact that the swing arm part is reduced in cost and weight, the protectability of the rear drive shaft 12 can be enhanced.

The configuration of the embodiment is an example and not limited to being applied to a four-wheeled buggy. As a matter of course, various changes or modifications may be made unless they depart from the spirit of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swing arm structure wherein a swing arm includes a pair of left and right arm bodies and a cross member for spanning therebetween, an end of the swing arm suspends rear wheels, and a rear wheel-driving rear drive shaft operatively connected to a rear final reduction gear unit is placed above the cross member,
   wherein, as viewed laterally, the cross member is contained within a profile of each arm body, and is formed to be trapezoidal in section such that a bottom portion thereof is broader than an upper portion thereof, and
   wherein the upper portion of the cross member is located at a position lower than an upper side portion of each arm body, and the bottom portion of the cross member extends along a lower side of each arm body.

2. The swing arm part structure according to claim 1, wherein each of the arm bodies is bent to project downwardly.

3. The swing arm part structure according to claim 1, wherein, while the drive shaft is disposed to be offset from the lateral middle of a vehicle body, a shock absorber is disposed at the lateral almost-middle of the vehicle body.

4. The swing arm part structure according to claim 2, wherein, while the drive shaft is disposed to be offset from the lateral middle of a vehicle body, a shock absorber is disposed at the lateral almost-middle of the vehicle body.

5. The swing arm part structure according to claim 1, wherein the drive shaft is disposed with an outer surface thereof exposed.

6. The swing arm part structure according to claim 2, wherein the drive shaft is disposed with an outer surface thereof exposed.

7. The swing arm part structure according to claim 3, wherein the drive shaft is disposed with an outer surface thereof exposed.

8. The swing arm part structure according to claim 5, wherein the cross member shields the exposed portion of the drive shaft.

9. The swing arm part structure according to claim 6, wherein the cross member shields the exposed portion of the drive shaft.

10. The swing arm part structure according to claim 7, wherein the cross member shields the exposed portion of the drive shaft.

11. A swing arm structure comprising:
    a swing arm having a pair of left and right arm bodies, said left and right arm bodies having a profile with a predetermined height;
    a cross member for spanning between the pair of left and right arm bodies;
    an end of the swing arm being adapted for suspending rear wheels; and
    a rear wheel-driving rear drive shaft operatively connected to a rear final reduction gear unit, said rear wheel-driving rear drive shaft being positioned above the cross member,
    said cross member, as viewed laterally, is contained within said profile of each arm body, and is formed to be trapezoidal in section such that a bottom portion of said cross member is broader than an upper portion thereof,
    wherein the upper portion of the cross member is located at a position lower than an upper side portion of each arm body, and the bottom portion of the cross member extends along a lower side of each arm body.

12. The swing arm part structure according to claim 11, wherein each of the arm bodies is bent to project downwardly.

13. The swing arm part structure according to claim 11, wherein, while the drive shaft is disposed to be offset from the lateral middle of a vehicle body, a shock absorber is disposed at the lateral almost-middle of the vehicle body.

14. The swing arm part structure according to claim 12, wherein, while the drive shaft is disposed to be offset from the lateral middle of a vehicle body, a shock absorber is disposed at the lateral almost-middle of the vehicle body.

15. The swing arm part structure according to claim 11, wherein the drive shaft is disposed with an outer surface thereof exposed.

16. The swing arm part structure according to claim 12, wherein the drive shaft is disposed with an outer surface thereof exposed.

17. The swing arm part structure according to claim 13, wherein the drive shaft is disposed with an outer surface thereof exposed.

18. The swing arm part structure according to claim 15, wherein the cross member shields the exposed portion of the drive shaft.

19. The swing arm part structure according to claim 16, wherein the cross member shields the exposed portion of the drive shaft.

20. The swing arm part structure according to claim 17, wherein the cross member shields the exposed portion of the drive shaft.

21. The swing arm part structure according to claim 1, wherein the cross member includes a plate member having an arc-shaped cross-section extending along a lower side of each arm body when viewed laterally and a hat-shaped member having a hat-shaped section projecting upwardly as viewed laterally.

22. The swing arm part structure according to claim 21, wherein the hat-shaped member forms a trapezoidal-shaped inner space within the cross member.

23. The swing arm part structure according to claim 11, wherein the cross member includes a plate member having an arc-shaped cross-section extending along a lower side of each arm body when viewed laterally and a hat-shaped member having a hat-shaped section projecting upwardly as viewed laterally.

24. The swing arm part structure according to claim 23, wherein the hat-shaped member forms a trapezoidal-shaped inner space within the cross member.

* * * * *